(12) United States Patent
Ootake et al.

(10) Patent No.: US 8,944,222 B2
(45) Date of Patent: Feb. 3, 2015

(54) DAMPING VALVE

(75) Inventors: Kouji Ootake, Sagamihara (JP); Ryosuke Kamakura, Inuyama (JP); Toshihiro Mori, Kani (JP); Yuusuke Matsushita, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 133 days.

(21) Appl. No.: 13/582,958

(22) PCT Filed: Mar. 10, 2011

(86) PCT No.: PCT/JP2011/055618
§ 371 (c)(1),
(2), (4) Date: Sep. 5, 2012

(87) PCT Pub. No.: WO2011/111773
PCT Pub. Date: Sep. 15, 2011

(65) Prior Publication Data
US 2012/0325603 A1    Dec. 27, 2012

(30) Foreign Application Priority Data

Mar. 10, 2010  (JP) .................................. 2010-052909
Mar. 10, 2010  (JP) .................................. 2010-052910

(51) Int. Cl.
*F16F 9/34*    (2006.01)
*F16F 9/46*    (2006.01)
(52) U.S. Cl.
CPC ...................................... *F16F 9/465* (2013.01)
USPC ..................... 188/266.5; 251/318; 188/322.13

(58) Field of Classification Search
CPC ............ F16K 31/0665; F16K 31/0668; F16K 47/026; F16F 9/341; F16F 9/3405; F16F 9/46; F16F 9/464; F16F 9/465
USPC ......... 188/266.1, 266.2, 266.5, 266.6, 322.13; 251/50, 282, 318, 336, 369; 303/119.2
See application file for complete search history.

(56) References Cited

U.S. PATENT DOCUMENTS

| 2,833,602 | A | * | 5/1958 | Bayer .............................. 92/127 |
| 3,742,975 | A |   | 7/1973 | Kazama et al. |
| 5,413,196 | A | * | 5/1995 | Forster ........................ 188/266.6 |
| 7,730,875 | B2 | * | 6/2010 | Mori et al. ................ 251/129.07 |
| 2003/0089872 | A1 | * | 5/2003 | Furuta et al. ............. 251/129.14 |
| 2006/0065870 | A1 | * | 3/2006 | Mori et al. ................ 251/129.07 |
| 2008/0042093 | A1 |   | 2/2008 | Kim |

FOREIGN PATENT DOCUMENTS

| GB | 647453 A | * | 12/1950 |
| JP | 1973-036363 Y1 |  | 10/1973 |
| JP | 53-051451 |  | 12/1978 |
| JP | 1986-069566 U |  | 5/1986 |
| JP | 1986-154369 U |  | 9/1986 |
| JP | 62-036836 U |  | 3/1987 |
| JP | 1990-091276 U |  | 7/1990 |

(Continued)

*Primary Examiner* — Thomas J Williams
(74) *Attorney, Agent, or Firm* — Rabin & Berdo, P.C.

(57) ABSTRACT

A damping valve comprises a through-hole forming a passage for a working fluid. A poppet having a center axis is seated on a valve seat around the through-hole. The poppet is housed in a housing so as to be free to slide along the center axis. The poppet is pressed against one wall surface of the housing by a biasing mechanism, that biases the poppet in a direction perpendicular to the center axis, vibration of the poppet is thereby suppressed.

5 Claims, 6 Drawing Sheets

(56) References Cited

FOREIGN PATENT DOCUMENTS

| | | |
|---|---|---|
| JP | 1992-034576 U | 3/1992 |
| JP | 08061554 A | 3/1996 |
| JP | 2001-123887 A | 5/2001 |
| JP | 2003-262282 A | 9/2003 |
| JP | 2008045746 A | 2/2008 |
| JP | 2009-222136 A | 10/2009 |

* cited by examiner

DAMPING VALVE

FIELD OF THE INVENTION

This invention relates to a damping valve using a poppet valve body.

BACKGROUND OF THE INVENTION

JP2009-222136A issued by the Japan Patent Office in 2009 discloses a damping valve of a hydraulic damper including a poppet valve body.

The hydraulic damper comprises an outer tube outside a cylinder and a reservoir for working oil is formed in the outer tube outside the cylinder. A piston joined to a piston rod is housed in the cylinder. An oil chamber at the piston rod side and an oil chamber at an opposite side of the piston to the piston rod are delimited by the piston inside the cylinder.

The damping valve is provided in an oil passage for allowing the working oil to flow from the oil chamber at the piston rod side to the reservoir.

The leading end of a poppet forming the valve body is seated on a ring-shaped valve seat around a hole formed in the oil passage by a magnetic force of an excited solenoid, thereby closing the oil passage. In a state where the solenoid is not excited, the poppet is lifted from the valve seat and the working oil is allowed to flow via an annular clearance between the valve seat and the poppet.

When a pressure in the oil passage applied to the poppet increases in the state where the solenoid is excited, the leading end of the poppet is lifted from the valve seat against the magnetic force of the solenoid according to the pressure in the oil passage. As a result, the working oil flows into a valve chamber formed around the leading end of the poppet through the annular clearance formed between the valve seat and the leading end of the poppet. The valve chamber is formed with an outlet port for allowing the working oil to flow in a direction perpendicular to the leading end of the poppet, and the working oil flowed into the valve chamber from the oil passage flows out to the reservoir through the outlet port.

To support the poppet so as to be free to slide in an axial direction, the poppet comprises a base end formed to have a larger diameter than the leading end of the same. The base end of the poppet is fitted in a valve housing so as to be free to slide.

SUMMARY OF THE INVENTION

In a lifted state of the poppet, a flow of the working oil is formed in the valve housing from the hole toward the outlet port while detouring around the leading end of the poppet.

If a slide clearance between the base end of the poppet and the housing is widened due to manufacturing errors of parts and abrasion thereafter, this flow of the working oil may induce radial vibration of the poppet in the housing.

Particularly, in a case of a hydraulic damper interposed between a vehicle body and an axle of a vehicle, pressure in the oil chamber in the hydraulic damper drastically changes when the hydraulic damper absorbs road surface vibration. If the poppet vibrates in such a situation, it may cause noise or adversely affect a generated damping force.

It is therefore an object of this invention to suppress vibration of a poppet that is used as a valve body in a damping valve.

In order to achieve the above object, a damping valve according to this invention comprises a through-hole functioning as a passage for a fluid, a valve seat formed around the through-hole, and a poppet seated on the valve seat and having a center axis. The poppet is accommodated in a housing so as to be free to slide along the center axis. The damping valve further comprises a biasing mechanism that biases the poppet in a direction perpendicular to the center axis.

The details as well as other features and advantages of this invention are set forth in the remainder of the specification and are shown in the accompanying drawings.

DESCRIPTION OF THE PREFERRED EMBODIMENTS

Figure 1:
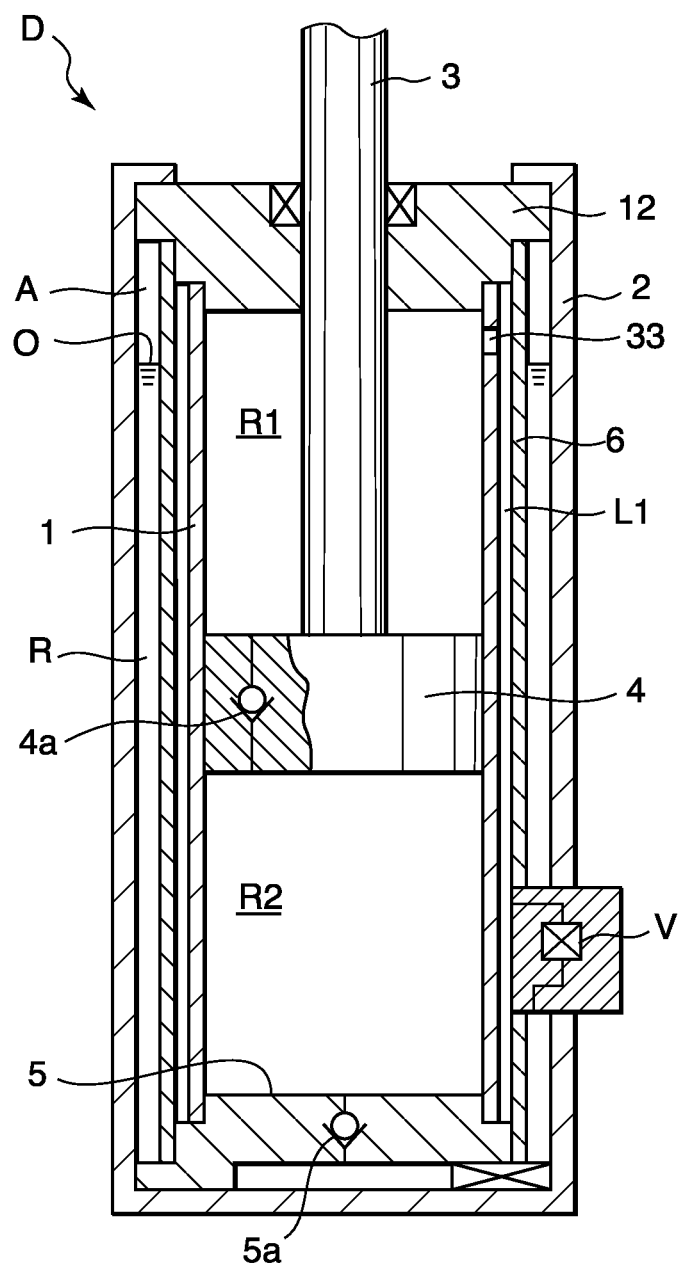
FIG. 1 is a schematic vertical sectional view of a hydraulic damper to which a damping valve according to this invention is applied.

Referring to FIG. 1 of the drawings, a damping valve V according to this invention is applied to a multi-cylinder uniflow type hydraulic damper D.

The hydraulic damper D comprises an outer tube 2 outside a cylinder 1 filled with working oil. A space between the cylinder 1 and the outer tube 2 is divided by an inner tube 6 into an oil passage L1 at an inner side and a reservoir R at an outer side. The cylinder 1, the inner tube 6 and the outer tube 2 are coaxially arranged.

A space in the cylinder 1 is divided by a piston 4 fixed to one end of a piston rod 3 into an oil chamber R1 at a piston rod 3 side and an oil chamber R2 at an opposite side to the piston rod 3. The piston 4 slides in an axial direction in the cylinder 1 according to intrusion and exit of the piston rod 3 into and from the cylinder 1, in other words, an elongation stroke and a contraction stroke of the hydraulic damper D.

A rod guide 12 is fixed to an upper end of the outer tube 2. The piston rod 3 projects outwardly in the axial direction of the cylinder 1 from the rod guide 12. Openings at upper ends of the outer tube 2, the inner tube 6 and the cylinder 1 are closed by the rod guide 12.

The outer tube 2 is in the form of a tube having a bottom and the inner tube 6 stands at a predetermined distance from the bottom of the outer tube 2. The bottom of the inner tube 6 is closed together with a bottom of the cylinder 1 by a base 5.

The reservoir R stores the working oil. A gas A is sealed above an oil level O of the reservoir R.

A check valve 5a is installed in the base 5. The check valve 5a allows the working oil in the reservoir R to flow into the oil chamber R2 without resistance as the oil chamber R2 at the opposite side to the piston rod 3 expands according to an elongation of the hydraulic damper D while inhibiting a flow of the working oil in an opposite direction. It should be noted that the reservoir R and the check valve 5a permanently communicate via a clearance between the inner tube 6 and the bottom of the outer tube 2.

A check valve 4a is provided in the piston 4. The check valve 4a allows excess working oil in the oil chamber R2 at the opposite side to the piston rod 3 to flow into the oil chamber R1 without resistance as the oil chamber R2 contracts according to a contraction stroke of the hydraulic damper D while inhibiting the flow of the working oil in an opposite direction.

The oil chamber R1 at the piston rod 3 side communicates with the oil passage L1 at the inner side of the inner tube 6 via a through-hole 33 formed in an upper part of the cylinder 1.

The damping valve V connects the oil passage L1 at the inner side of the inner tube 6 and the reservoir R at the outer side of the inner tube 6.

When the hydraulic damper D elongates, the working oil flows from the contracting oil chamber R1 at the piston rod 3 side to the reservoir R via the damping valve V to generate an elongation damping force based on the flow resistance of the damping valve V. When this hydraulic damper D contracts, the working oil flows from the oil chamber R2 at the opposite side to the piston rod 3 into the oil chamber R1 at the piston rod 3 side via the check valve 4a. However, the working oil equivalent to the volume of the intruding piston rod 3 into the cylinder 1 becomes excessive in the cylinder 1. This working oil flows from the oil chamber R1 to the reservoir R via the damping valve V to generate a contraction damping force based on the flow resistance of the damping valve V That is, during both the elongation stroke and the contraction stroke of the hydraulic damper D, the working oil in the cylinder flows to the reservoir R via the damping valve V and generates a damping force depending on a flow rate of the flowing working oil.

If a cross-sectional area of the piston rod 3 and that of the oil chamber R2 at the opposite side to the piston rod 3 are set at one to two, the flow rates of the working oil flowing from the oil chamber R2 into the reservoir R via the damping valve V during the elongation stroke and the contraction stroke of the hydraulic damper D become equal and the hydraulic damper D generates an equal damping force for the elongation stroke and the contraction stroke.

Figure 2:
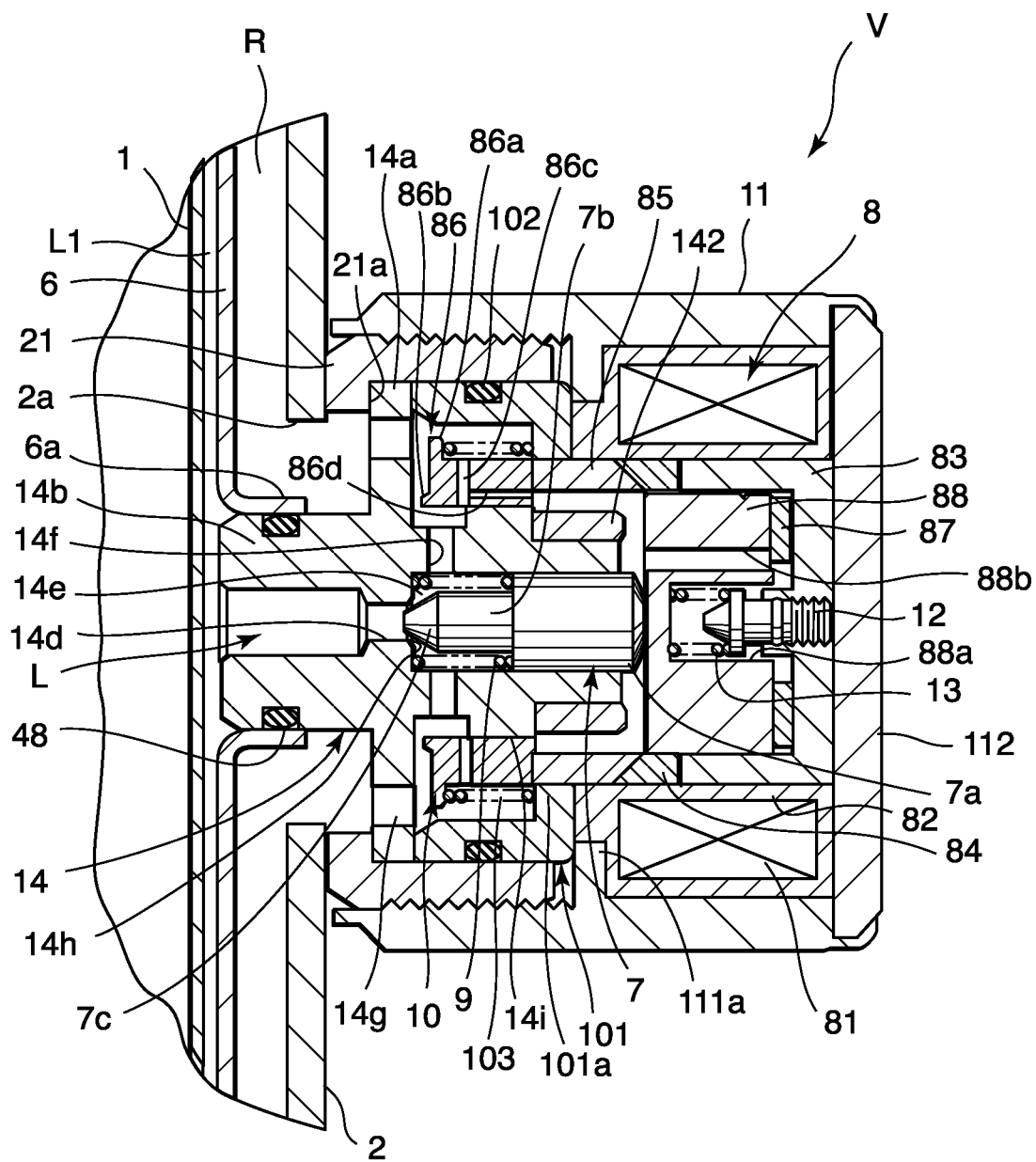
FIG. 2 is a vertical sectional view of the damping valve according to this invention.

Referring to FIG. 2, the damping valve V is housed in a valve case 11 together with a failsafe valve 10.

The outer tube 2 comprises an aperture 2a in the side surface. A cylindrical socket 21 is so fixed to the outer peripheral surface of the outer tube 2 by welding or the like so as to surround the aperture 2a. The cylindrical valve case 11 is screwed onto the outer periphery of the socket 21. A lid 112 is fixed to a tip of the valve case 11 by caulking.

A flange 111a projecting toward a center of the valve case 11 is formed on the inner periphery of the valve case 11. A solenoid 8 is sandwiched between the flange 111a and the lid 112.

The solenoid 8 comprises a coil 81 and a bobbin 82 on which the coil 81 is wound. The leading end of the bobbin 82 is engaged with the flange 111a. The rear end of the bobbin 82 is in contact with the lid 112. A cylindrical first fixed iron core 83 is fitted to the inner periphery of the bobbin 82 with a bottom thereof held in contact with the lid 112.

A spacer 84 having the same cross-section and made of a nonmagnetic material is fitted to the inner periphery of the bobbin 82 to as to abut on the leading end of the first fixed iron core 83. Further, a second fixed iron core 85 having the same cross-section and made of a magnetic material is fitted to the inner periphery of the bobbin 82 so as to abut on the leading end of the spacer 84.

The leading end of the second fixed iron core 85 projects from the bobbin 82 in an axial direction. An outer movable iron core 86 made of a magnetic material is arranged coaxially with the second fixed iron core 85. The outer movable iron core 86 forms a valve body of the failsafe valve 10.

An inner movable iron core 88 is housed inside the first fixed iron core 83. A ring-shaped washer 87 made of a nonmagnetic material is interposed between one end of the inner movable iron core 88 and the first fixed iron core 83. A recess 88a facing the bottom of the first fixed iron core 83 is formed in the center of the inner movable iron core 88.

A spring force adjusting screw 12 is screwed into a center of the bottom of the first fixed iron core 83 in the axial direction. The leading end of the spring force adjusting screw 12 projects into the recess 88a. In the recess 88a, a spring 13 is interposed between the inner movable iron core 88 and the spring force adjusting screw 12. The spring 13 is supported on the spring force adjusting screw 12 and biases the inner movable iron core 88 in a direction away from the bottom of the first fixed iron core 83.

According to this structure, the spring force adjusting screw 12 cannot be operated after the lid 112 is fixed to the valve case 11 by caulking. For example, if the lid 112 is configured to be removable from the valve case 11 such as by screwing the lid 112 onto the valve case 11, the spring force adjusting screw 12 can be operated by removing the lid 112 from the valve case 11 even after the assembling of the hydraulic damper D is completed.

The inner tube 6 comprises a sleeve 6a that is laterally open. An end part 14b of a valve housing 14 is fitted to the inner periphery of the sleeve 6a. An inlet port L communicating with the oil passage L1 between the inner tube 6 and the cylinder 1 is formed in the end part 14b. A seal member 48 is arranged between the sleeve 6a and the end part 14b of the valve housing 14 so that the working oil in the oil passage L1 does not leak out from the inner tube 6.

In the valve housing 14, a small-diameter portion 14d having a small diameter and a valve chamber 14e having a diameter larger than that of the small-diameter portion 14d are coaxially formed, abutting on the inlet port L. Further, a plurality of outlet ports 14f are formed which radially penetrate the valve housing 14 from the valve chamber 14e. A ring-shaped valve seat 14h is formed around an opening of the small-diameter portion 14d facing the valve chamber 14e.

A base end 7a of a poppet 7 forming the valve body of the damping valve V is fitted into the valve chamber 14e so as to be free to slide along a center axis of the poppet 7. The base end 7a of the poppet 7 projects from the valve housing 14 along the center axis and comes into contact with the inner movable iron core 88. The poppet 7 comprises a leading end 7b having a smaller diameter than the base end 7a. A conical valve head 7c is formed at a tip of the leading end 7b. The valve head 7c is seated on the valve seat 14h, thereby blocking communication between the inlet port L and the valve chamber 14e.

In the valve chamber 14e, a spring 9 is interposed between the valve seat 14h and a step between the base end 7a and the leading end 7b of the poppet 7. The spring 9 biases the poppet 7 toward the inner movable iron core 88. It should be noted that since the spring 9 is arranged in series with the spring 13, a spring load of the spring 9 is simultaneously adjusted in the case of adjusting a spring load of the spring 13 by the spring force adjusting screw 12.

On the outer periphery of the valve housing 14, a flange 14a and a large-diameter portion 14i are formed over the entire circumference at positions to sandwich the outlet ports 14f in a direction of the center axis.

The outer periphery of the flange 14a reaches the inner peripheral surface of the socket 21. A cylindrical spacer 101 is fitted inside the socket 21. The spacer 101 is formed with an inward facing flange 101a at a tip opposite to the flange 14a. The flange 101a comes into contact with the flange 111a of the valve case 11 and also comes into contact with an axial end part of the bobbin 82 of the solenoid 8.

The flange 14a is sandwiched between the flange 111a and a step 21a inside the socket 21 via the spacer 101 by screwing the valve case 11 onto the outer periphery of the socket 21. To prevent the leakage of the working oil from the inside to the outside of the spacer 101, a seal member 102 is interposed between the spacer 101 and the socket 21.

The second fixed iron core 85 projecting in the axial direction from the bobbin 82 is fitted to the inner periphery of the flange 101a.

The outer movable iron core 86 corresponding to the valve body of the failsafe valve 10 is in the form of a thick tube and fitted to the outer periphery of the large-diameter portion 14i of the valve housing 14. The outer movable iron core 86 comprises a flange 86a parallel to the flange 14a of the valve housing 14 and an annular projection 86b projecting from an inner peripheral part toward the flange 14a. A spring 103 for biasing the outer movable iron core 86 toward the flange 14a is interposed between the flange 86a and the flange 101a of the spacer 101. In a state where the solenoid 8 is not excited, the outer movable iron core 86 is held at an advanced position where the annular projection 86b is in contact with the flange 14a of the valve housing 14.

The outer movable iron core 86 is formed with a plurality of orifices 86c penetrating a tube wall surface and allowing communication between the inside and the outside of the outer movable iron core 86. The outer movable iron core 86 is further formed with a through-hole 86d connecting a space defined by the valve housing 14, the outer movable iron core 86 and the poppet 7 inside a continuous cylinder formed by the first fixed iron core 83, the spacer 84 and the second fixed iron core 85 and one of the orifices 86c.

The flange 14a is formed with a communication hole 14g. The inlet port L communicates with the reservoir R via the small-diameter portion 14d, the valve chamber 14e, the outlet ports 14f, the interior of the spacer 101 in which the movable iron core 86 is housed, the communication hole 14g, and the aperture 2a of the outer tube 2.

A tubular stopper 142 made of a nonmagnetic material is fitted onto the outer periphery of the valve housing 14 between the large-diameter portion 14i and the inner movable iron core 88. When the inner movable iron core 88 comes into contact with the stopper 142, any further axial displacement of the inner movable iron core 88 is restricted. It should be noted that if the washer 87 and the stopper 142 are preferably made of a synthetic resin material, impact and noise generation when the inner movable iron core 88 collides with the washer 87 or the stopper 142 can be suppressed.

The inner movable iron core 88 is formed with dimensions such that, in a state where it is in contact with the washer 87, the outer periphery of the leading end thereof slightly overlaps the second fixed iron core 85. The inner movable iron core 88 is provided with a through hole 88b for equalizing working oil pressures acting on the both axial end surfaces.

When the solenoid 8 is excited, a magnetic path passing through the first fixed iron core 83, the inner movable iron core 88 and the second fixed iron core 85 is formed. At this time, by forming a tapered surface on the leading end of the spacer 84 made of the nonmagnetic material so that an axial length of the inner periphery is shorter than that of the outer periphery and also forming a similar tapered surface on the base end of the second fixed iron core 85 to be joined to the former tapered surface, a magnetic flux of the excited solenoid 8 is concentrated closer to the inner peripheries of the first and second fixed iron cores 83 and 85 and the magnetic path is more likely to be formed via the inner movable iron core 88. By forming such a magnetic path, the inner movable iron core 88 is attracted toward the second fixed iron core 85 against a repulsive force of the spring 9 acting via the poppet 7.

As the inner movable iron core 88 attracted toward the second fixed iron core 85 is axially displaced, the poppet 7 whose base end is in contact with the inner movable iron core 88 is driven toward the valve seat 14h by the inner movable iron core 88 to seat the valve head 7c on the valve seat 14h.

On the other hand, the magnetic path formed by the excited solenoid 8 reaches the valve case 11 from the second fixed iron core 85 through the outer movable iron core 86, the valve housing 14 and the socket 21. As a result, the outer movable iron core 86 at the advanced position is attracted toward the second fixed iron core 85 against the spring 103 and comes into contact with the second fixed iron core 85, thereby forming a flow path between the annular projection 86b and the flange 14a.

That is, when the solenoid 8 is in a non-excited state, the damping valve V is lifted from the valve seat 14h to allow communication between the inlet port L and the valve chamber 14e via the annular space between the poppet 7 and the valve seat 14h. The outer movable iron core 86 that is a failsafe valve is held at the advanced position where the annular projection 86b is in contact with the flange 14a and closes the flow path for the working oil extending from the valve chamber 14e to the communication hole 14g via the outlet ports 14f and a clearance between the annular projection 86b and the flange 14a. In this state, the working oil relatively easily flows from the inlet port L into the valve chamber 14e via the small-diameter portion 14d. On the other hand, the working oil in the valve chamber 14e flows out to the communication hole 14g via the orifices 86c. Under this flow path configuration, the orifices 86c having a smallest flow cross-section mainly generates a damping force.

If the supply of an excitation current to the solenoid 8 stops due to a certain trouble, therefore, the damping valve V and the failsafe valve 10 are held at the positions described above. This state is referred to as a fail state. Even if the damping valve V does not generate a sufficient damping force in the fail state, a necessary minimum damping force can be generated by the failsafe valve 10 arranged in series with the damping valve V in this way.

On the other hand, when the solenoid 8 is excited, the damping valve V is brought into a closed state where the valve head 7c is seated on the valve seat 14h. The failsafe valve 10 is brought into an open state where a flow path is formed between the annular projection 86b and the flange 14a by the second fixed iron core 85 attracting the outer movable iron core 86.

In this state, the poppet 7 has to be lifted from the valve seat 14h by a pressure in the small-diameter portion 14d in order to cause the working oil to flow into the valve chamber 14e from the inlet port L. The excitation current of the solenoid 8 changes a cracking pressure in this state. Further, the damping force generated by the damping valve V after the poppet 7 is lifted also changes according to the excitation current of the solenoid 8.

In the damping valve V, a displacement in a radial direction and a oscillation about the center axis are prevented by fitting the base end 7a of the poppet 7 to the inner periphery of the valve chamber 14e.

The working oil flowing out from the small-diameter portion 14d to the outlet ports 14f via the valve chamber 14e exerts a force in a direction other than the axial direction to the poppet 7. When the base end 7a is fitted to the inner periphery of the valve chamber 14e with a proper slide clearance, the poppet 7 is held on the center axis. However, if either the base end 7a or the valve chamber 14e has a manufacturing error or if a slide contact surface of the base end 7a of the poppet 7 and the inner periphery of the valve chamber 14e are abraded due to repeated operation of the hydraulic damper D, the force exerted on the poppet 7 in the direction other than the axial direction by the working oil flowing from the small-diameter portion 14d to the outlet port 14f via the valve chamber 14e induces vibration of the poppet 7. In such an operating condition of the hydraulic damper D that a pressure of the inlet port L frequently changes, the hydraulic damper D may generate noise by this vibration of the poppet 7.

This invention provides a biasing mechanism for biasing the poppet 7 in a direction perpendicular to the center axis to prevent vibration of the poppet 7.

Figure 3:
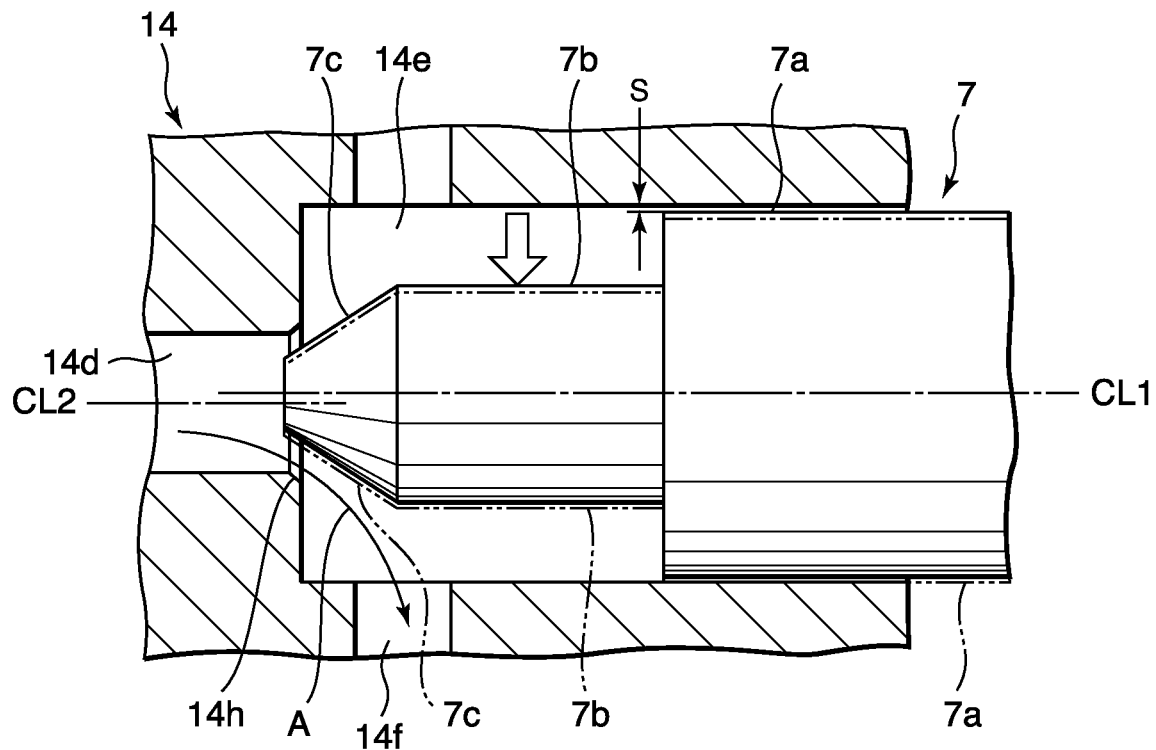
FIG. 3 is an enlarged side view of a poppet according to this invention.

Referring to FIG. 3, a slide clearance S is assumed to be set in advance between the inner peripheral surface of the valve chamber 14e and the base end 7a of the poppet 7. It should be noted that the spring 9 shown in FIG. 2 is not shown in FIG. 3 to explain the flow of the working oil in the valve chamber 14e. The spring 9 is also not shown in FIGS. 5 to 8 for the same reason.

The formation position of the small-diameter portion 14d is set to be displaced to a lower side in the figure in advance so that a center axis CL2 of the small-diameter portion 14d is located slightly below a common center axis CL1 on which both the poppet 7 and the valve chamber 14e are located.

Figure 4:
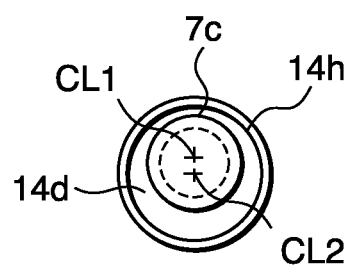
FIG. 4 is a cross sectional view of a poppet leading end and a hole part according to this invention.

Referring to FIG. 4, by this setting, the valve head 7c of the poppet 7 is held at a position deviated to an upper side when viewed along a direction of the center axis CL2 of the small-diameter portion 14d. In other words, a flow cross-section of the working oil flowing from the small-diameter portion 14d into the valve chamber 14e is largest below the valve head 7c.

Referring again to FIG. 3, the working oil flowed into the valve chamber 14e flows out of the valve housing 14 from the outlet ports 14f. The working oil reaching the outlet ports 14f from the small-diameter portion 14d through the valve chamber 14e flows more below the valve head 7c having a larger flow cross-section as shown by an arrow A in FIG. 3. That is, a flow velocity is faster in an area below the valve head 7c than in an area above the valve head 7c, and the working oil pressure is reduced by that difference in velocity. Due to this pressure difference, a downward force in the figure acts on the poppet 7.

Upon receiving this pressing force, the poppet 7 is displaced downwardly in a range permitted by the slide clearance S as shown by a double-dotted line in the figure, and the base end 7a of the poppet 7 is pressed against the lower wall surface of the valve chamber 14e. This pressing force acts as a force for inhibiting the base end 7a of the poppet 7 from being separated from the lower wall surface of the valve chamber 14e even when such a force as to induce vibration acts on the poppet 7. The vibration preventing mechanism thus suppresses vibration of the poppet 7.

In FIGS. 3 and 4, the small-diameter portion 14d is formed at the position deviated downwardly relative to the valve chamber 14e. A direction of deviation may not necessarily be a downward direction, but it is desirable in suppressing vibration of the poppet 7 that a vibration input direction and a direction of pressing the poppet 7 against the wall surface of the valve chamber 14e overlap in the same plane. That is, in the case of this embodiment, a particularly large effect in preventing vibration of the poppet 7 is obtained by the action of a pressing force in either upward or downward direction relative to the poppet 7.

Figure 5:
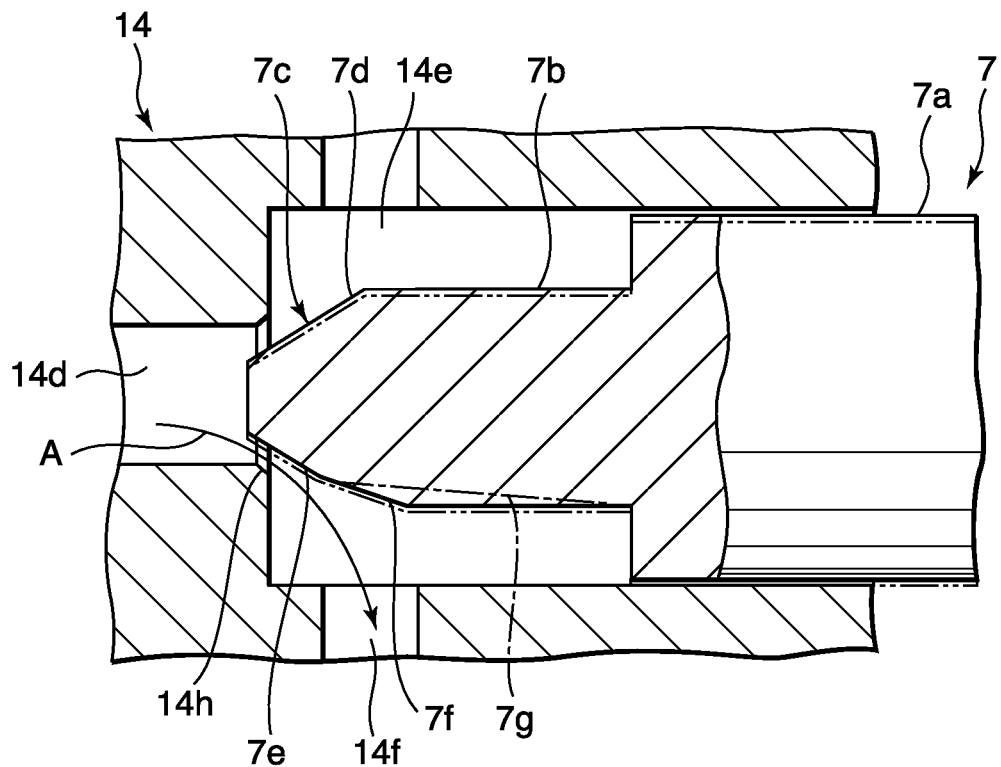
FIG. 5, similar to FIG. 3, but shows a second embodiment of this invention.

Referring to FIG. 5, a second embodiment of this invention related to the vibration preventing mechanism for the poppet 7 will be described.

In this embodiment, the same function is obtained by changing the shape of the valve head 7c instead of making the valve head 7c deviate in the small-diameter portion 14d.

A tapered surface 7d is formed on an upper part of the valve head 7c in the figure, whereas a tapered surface 7e having the same inclination as the tapered surface 7d and a tapered surface 7f having a more moderate inclination than the tapered surface 7d are formed on a lower part of the valve head 7c. Herein, the moderate inclination means a small angle of intersection with the center axis CL1. That is, the tapered surface has the same inclination over 360° at the leading end of the valve head 7c, but the tapered surface 7e on the lower part of the valve head 7c changes to the moderately inclined tapered surface 7f at a predetermined distance from the leading end.

As a result, a cross-section of the flow of the working oil shown by an arrow A in FIG. 5 from the small-diameter portion 14d to the outlet ports 14f located at a lower side in the figure becomes larger than that of the flow of the working oil from the small-diameter portion 14d to the outlet port 14f at an upper side in the figure.

Also in this case, a downward force corresponding to a flow velocity difference acts on the poppet 7 as in the case of the first embodiment and the poppet 7 is pressed against the lower wall surface of the valve chamber 14e as shown by a double-dotted line in FIG. 5. As a result, vibration of the poppet 7 can be suppressed.

Various variations are possible for the tapered surface 7f. For example, it is also possible to use a moderate tapered surface 7g reaching between the leading end 7b and the base end 7a as shown by a single-dotted line in FIG. 5 instead of the tapered surface 7f.

Figure 6:
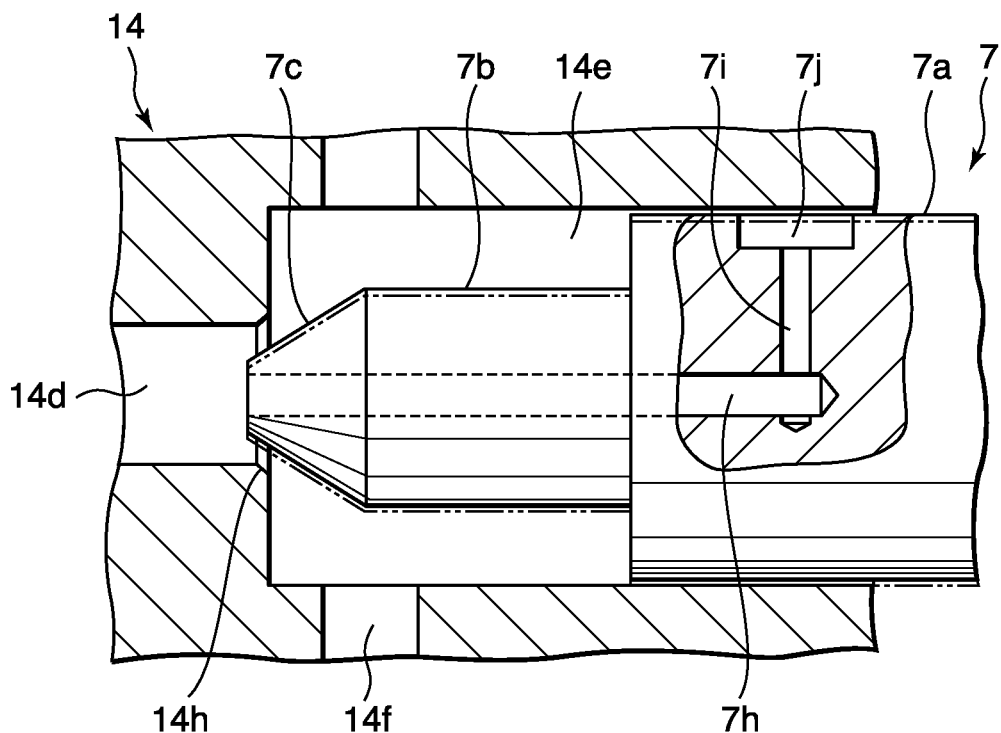
FIG. 6, similar to FIG. 3, but shows a third embodiment of this invention.

Referring to FIG. 6, a third embodiment of this invention related to the vibration preventing mechanism for the poppet 7 will be described.

In this embodiment, the poppet 7 is formed with a hole 7h extending from the valve head 7c to the inside of the base end 7a. An end of the hole 7h is connected to a lateral hole 7i formed in the base end 7a. The lateral hole 7i is open in the outer periphery of the base end 7a via a pressure acting chamber 7j formed in an upper part of the base end 7a in the figure.

In this embodiment, the pressure of the working oil flowing from the small-diameter portion 14d into the valve chamber 14e acts on the wall surface of the valve chamber 14e via the hole 7h, the lateral hole 7i and the pressure acting chamber 7j. This pressure acting between the pressure acting chamber 7j and the wall surface of the valve chamber 14e exerts a downward force on the poppet 7 and presses the poppet 7 against the lower wall of the valve chamber 14e as shown by a double-dotted line in FIG. 6. As a result, vibration of the poppet 7 can be suppressed.

Figure 7:
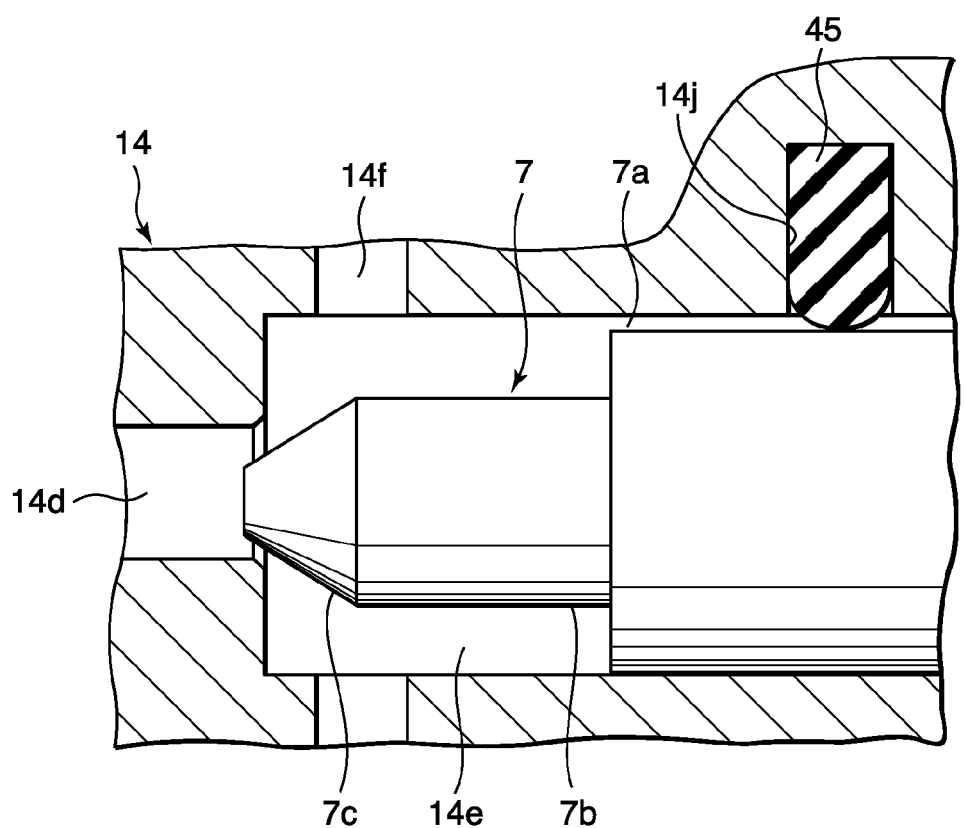
FIG. 7 is an enlarged side view of a poppet according to a fourth embodiment of this invention.

Referring to FIG. 7, a fourth embodiment of this invention in which the poppet 7 is loaded with an elastic force in advance will be described.

In this embodiment, the valve housing 14 is formed with a hole 14j facing the valve chamber 14e in a direction perpendicular to the center axis of the poppet 7, and the base end 7a of the poppet 7 is biased toward the wall surface of the valve chamber 14e at an opposite side by a rubber member 45 housed in the hole 14j.

This configuration is realized by forming a through hole reaching the inside of the valve chamber 14e from the outside of the valve housing 14 and plugging the through hole from the outside of the valve housing 14 after the rubber member 45 is inserted into the through hole from the outside of the valve housing 14. The plugged through hole functions as the hole 14j.

According to this embodiment, the poppet 7 is constantly loaded with an elastic force of the rubber member 45 in a lateral direction and pressed against the lower wall surface of the valve chamber 14e in the figure. As a result, vibration of the poppet 7 can be suppressed. According to this embodiment, the invention can be carried out without working upon the poppet 7.

Figure 8:
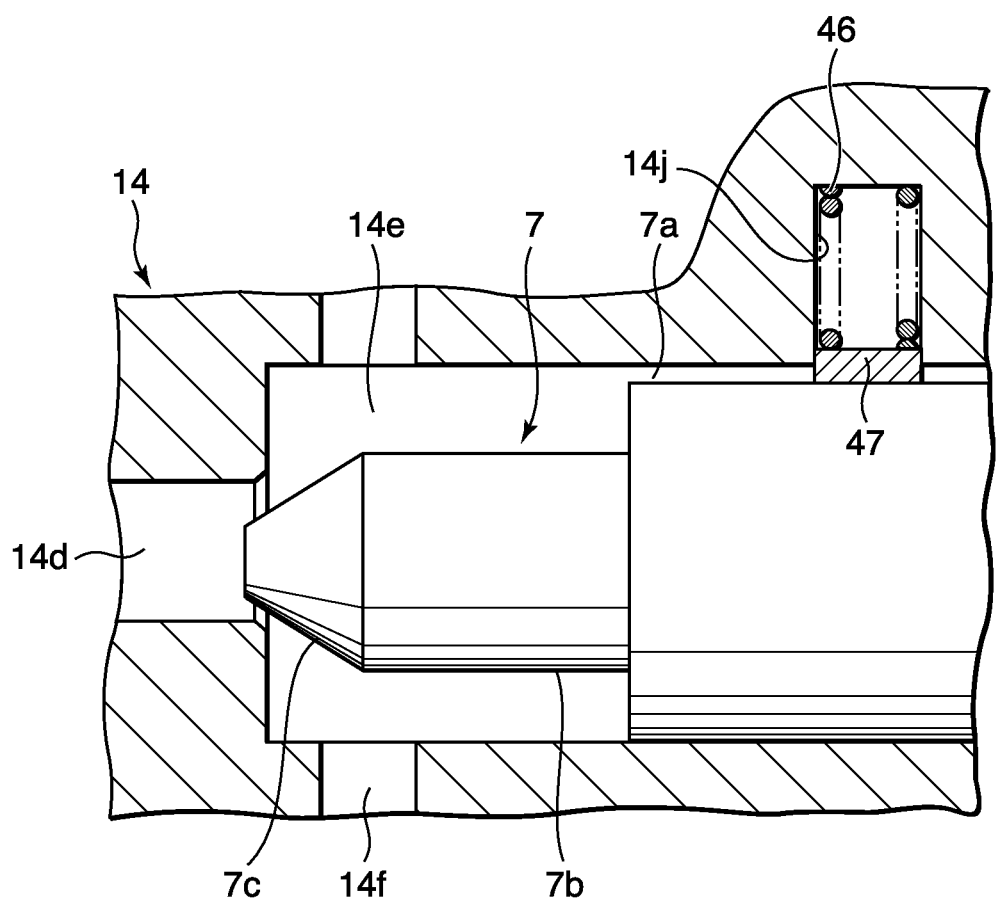
FIG. 8, similar to FIG. 7, but shows a fifth embodiment of this invention.

Referring to FIG. 8, a fifth embodiment of this invention in which the poppet 7 is loaded with an elastic force in advance will be described.

In this embodiment, a hole 14j is formed in a direction perpendicular to the center axis of the poppet 7 in the valve chamber 14e as in the case of the fourth embodiment. Instead of the rubber member 45 of the fourth embodiment, however, a coil spring 46 is housed in the hole 14j and a shoe 47 held in sliding contact with the base end 7a of the poppet 7 is supported by the coil spring 46.

In this embodiment as well, a through hole reaching the inside of the valve chamber 14e from the outside of the valve housing 14 is formed in advance as in the case of the fourth embodiment. After the poppet is 7 inserted into the valve chamber 14e and the shoe 47 and the coil spring 46 are successively inserted into the through hole from the outside of the valve housing 14, the through hole is plugged from the outside of the valve housing 14. The plugged through hole functions as the hole 14j.

According to this embodiment also, an elastic force by the coil spring 46 constantly exerts a downward force to the poppet 7 via the shoe 47 and presses the poppet 7 against the lower wall surface of the valve chamber 14e in the figure. As a result, vibration of the poppet 7 can be suppressed. In this embodiment as well, it is not necessary to work upon the poppet 7.

In the fourth and fifth embodiments, it is desirable in increasing an effect of suppressing vibration of the poppet 7 that a vibration input direction and a direction of pressing the poppet 7 against the wall surface of the valve chamber 14e overlap in the same plane. That is, a particularly large effect in preventing vibration of the poppet 7 is obtained by forming the hole 14j for housing the rubber member 45 or the coil spring 46 in the upper part or the lower part of the valve chamber 14e in the figure.

In each of the embodiments described above, the hydraulic damper D elongates and contracts in the vertical direction in FIGS. 1 and 2. Since the center axis of the poppet 7 is perpendicular to the center axis of the hydraulic damper D, vibration absorbed by the hydraulic damper D causes the poppet 7 to vibrate in the lateral direction. Further, the working oil passes through the single damping valve V during both an extension stroke and a contraction stroke in the uniflow hydraulic damper D, and hence the damping valve V is used frequently. As a result, vibration of the poppet 7 is more likely to occur. According to this invention, however, by applying a force to press the poppet 7 against the wall surface of the valve chamber 14e, vibration of the poppet 7 is prevented. Accordingly, a preferable effect is obtained in suppressing noise generation of the hydraulic damper D and stabilizing a generated damping force.

The contents of Tokugan 2010-052909 and Tokugan 2010-052910, with a filing date of Mar. 10, 2010 in Japan, are hereby incorporated by reference. Although the invention has been described above with reference to certain embodiments, the invention is not limited to the embodiments described above. Modifications and variations of the embodiments described above will occur to those skilled in the art, within the scope of the claims.

For example, a driving structure for the poppet 7 is not limited in this invention. Further, a fluid such as an aqueous solution other than working oil may be used as a working fluid.

INDUSTRIAL FIELD OF APPLICATION

As described above, the damping valve according to this invention produces a preferable effect in preventing generation of a noise and oscillation in a damping force of a fluid pressure damper for a vehicle.

The embodiments of this invention in which an exclusive property or privilege is claimed are defined as follows:

The invention claimed is:

1. A damping valve, comprising:
a through-hole functioning as a passage for a working fluid;
a valve seat formed around the through-hole;
a poppet seated on the valve seat and having a center axis;
a housing having a valve chamber that accommodates the poppet so as to be free to slide along the center axis;
the poppet including a base end that is fitted into the valve chamber and a leading end that has a smaller diameter than the base end and projects from the base end toward the valve seat so as to be seated on the valve seat from a valve chamber side; and
a biasing mechanism that biases the poppet in a direction perpendicular to the center axis, the biasing mechanism including a hole that is formed in the poppet and leads a fluid pressure acting on the leading end of the poppet to a pressure acting chamber formed on a limited part of an outer periphery of the base end with respect to a circumferential direction to exert the fluid pressure on a wall of the valve chamber facing the pressure acting chamber, the base end of the poppet having no chamber communicating with the hole on the outer periphery thereof other than the pressure acting chamber such that the fluid pressure in the pressure acting chamber keeps an outer surface of the poppet at an opposite side of the base end to the pressure acting chamber to have a sliding contact with another wall of the valve chamber;
wherein the valve chamber includes an outlet port for the working fluid in a position facing the leading end of the poppet.

2. The damping valve as defined by claim 1, wherein the hole has an opening in a valve head on the leading end of the poppet.

3. The damping valve as defined in claim 1, wherein the damping valve is configured to cause the working fluid to flow from the valve seat to the outlet port via a space in the valve chamber on the outside of the leading end of the poppet when the leading end of the poppet is lifted from the valve seat.

4. The damping valve as defined in claim 1, wherein the leading end of the poppet includes a valve head to be seated on the valve seat while causing the working fluid to flow between the valve seat and the valve head when the leading end of the poppet is lifted from the valve seat.

5. The damping valve as defined in claim 4, wherein the valve head has a tapered surface on an outer periphery thereof.

* * * * *

UNITED STATES PATENT AND TRADEMARK OFFICE
CERTIFICATE OF CORRECTION

PATENT NO. : 8,944,222 B2  
APPLICATION NO. : 13/582958  
DATED : February 3, 2015  
INVENTOR(S) : Kouji Ootake et al.

It is certified that error appears in the above-identified patent and that said Letters Patent is hereby corrected as shown below:

On the Title Page, Item 56 (References Cited; FOREIGN PATENT DOCUMENTS)

Please replace the list of FOREIGN PATENT DOCUMENTS with the following list:

-- FOREIGN PATENT DOCUMENTS

| | | | | |
|---|---|---|---|---|
| GB | 647453 | A | * | 12/1950 |
| JP | 1973-036363 | B1 | | 11/1973 |
| JP | 53-051451 | Y2 | | 12/1978 |
| JP | 1986-069566 | U | | 5/1986 |
| JP | 1986-154369 | U | | 9/1986 |
| JP | 62-036836 | U | | 3/1987 |
| JP | 1990-091276 | U | | 7/1990 |
| JP | 1992-034576 | U | | 3/1992 |
| JP | 08061554 | A | | 3/1996 |
| JP | 2001-123887 | A | | 5/2001 |
| JP | 2003-262282 | A | | 9/2003 |
| JP | 2008045746 | A | | 2/2008 |
| JP | 2009-222136 | A | | 10/2009 |

*cited by examiner --

Signed and Sealed this  
Fourteenth Day of July, 2015

Michelle K. Lee  
*Director of the United States Patent and Trademark Office*